(12) United States Patent
Pflueger

(10) Patent No.: US 7,028,381 B2
(45) Date of Patent: Apr. 18, 2006

(54) CASTING SHEET COMPOSITE BODY AND METHOD FOR PRODUCING THE SAME

(75) Inventor: Gerhard Pflueger, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 69 days.

(21) Appl. No.: 10/169,018

(22) PCT Filed: Aug. 17, 2001

(86) PCT No.: PCT/DE01/03155

§ 371 (c)(1),
(2), (4) Date: Sep. 26, 2002

(87) PCT Pub. No.: WO02/36300

PCT Pub. Date: May 10, 2002

(65) Prior Publication Data

US 2003/0056358 A1 Mar. 27, 2003

(30) Foreign Application Priority Data

Nov. 2, 2000 (DE) .......................... 100 54 330

(51) Int. Cl.
*B23P 17/00* (2006.01)
*B23P 25/00* (2006.01)

(52) U.S. Cl. ................. 29/421.1; 29/890.039; 29/527.5; 29/527.6; 164/319

(58) Field of Classification Search ............... 29/421.1, 29/890.039, 527.5, 527.6, 527.7; 164/319; 165/158

See application file for complete search history.

(56) References Cited

U.S. PATENT DOCUMENTS

| 1,919,540 | A | * | 7/1933 | Otto .......................... 310/42 |
| 2,108,996 | A | * | 2/1938 | Sansome ..................... 164/306 |
| 3,039,744 | A | * | 6/1962 | Heinz et al. .................. 165/83 |
| 3,096,566 | A | * | 7/1963 | Ivar ........................... 29/611 |
| 3,364,549 | A | * | 1/1968 | Valyi ..................... 29/890.042 |
| 5,097,689 | A | * | 3/1992 | Pietrobon ...................... 72/58 |
| 5,775,238 | A | * | 7/1998 | Hauser ....................... 110/282 |
| 6,513,584 | B1 | * | 2/2003 | Lehmann et al. ........... 165/166 |

FOREIGN PATENT DOCUMENTS

| FR | 1 580 381 A | 9/1969 |
| GB | 1 404 485 A | 8/1975 |
| WO | 97 44882 A | 11/1997 |

* cited by examiner

*Primary Examiner*—Eric Compton
(74) *Attorney, Agent, or Firm*—Michael J. Striker

(57) ABSTRACT

A method for producing a cast/sheet-metal composite body, comprising the following steps: provide a casting mold (12), place at least one sheet-metal part (11) in the casting mold (12), produce a cast part (2) interconnected with the at least one sheet-metal part (11), and apply pressure to the at least one sheet-metal part (11) to form a hollow space (8).

9 Claims, 5 Drawing Sheets

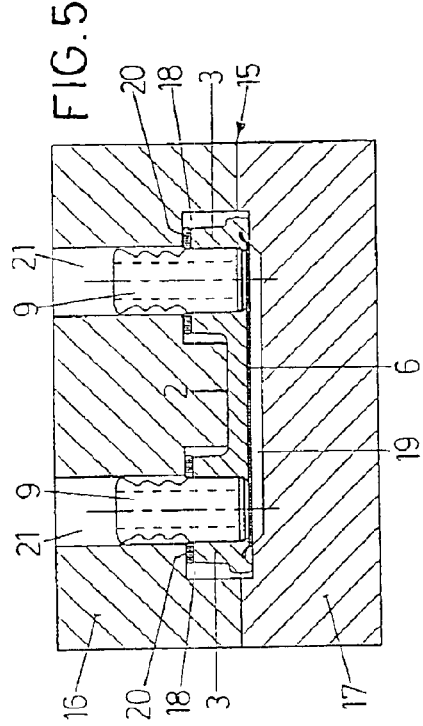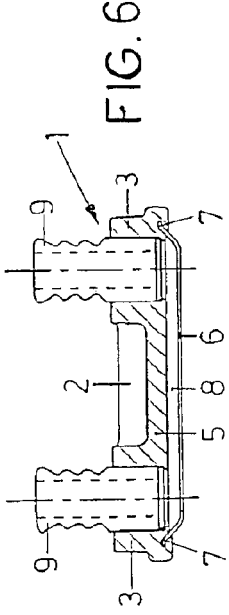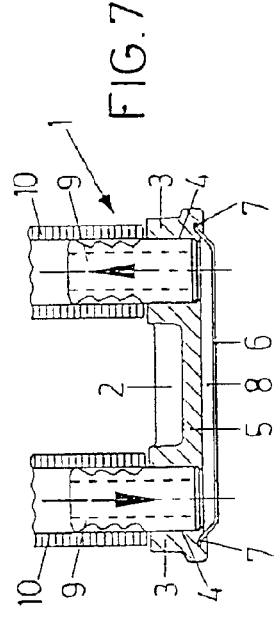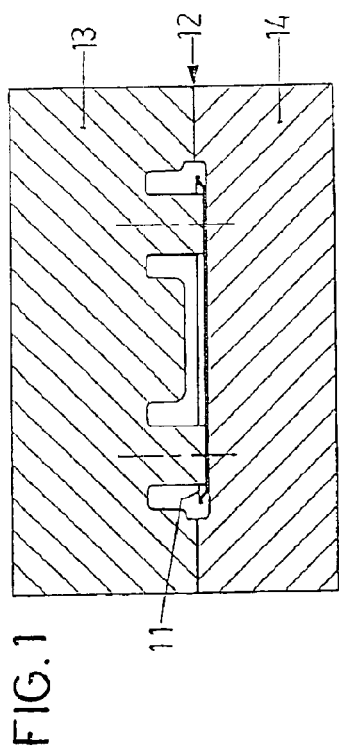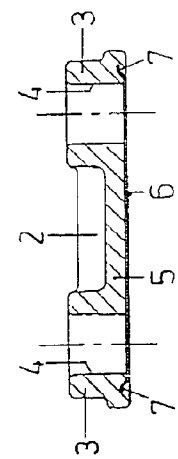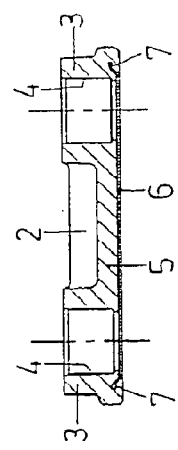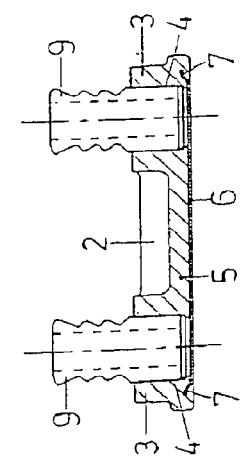

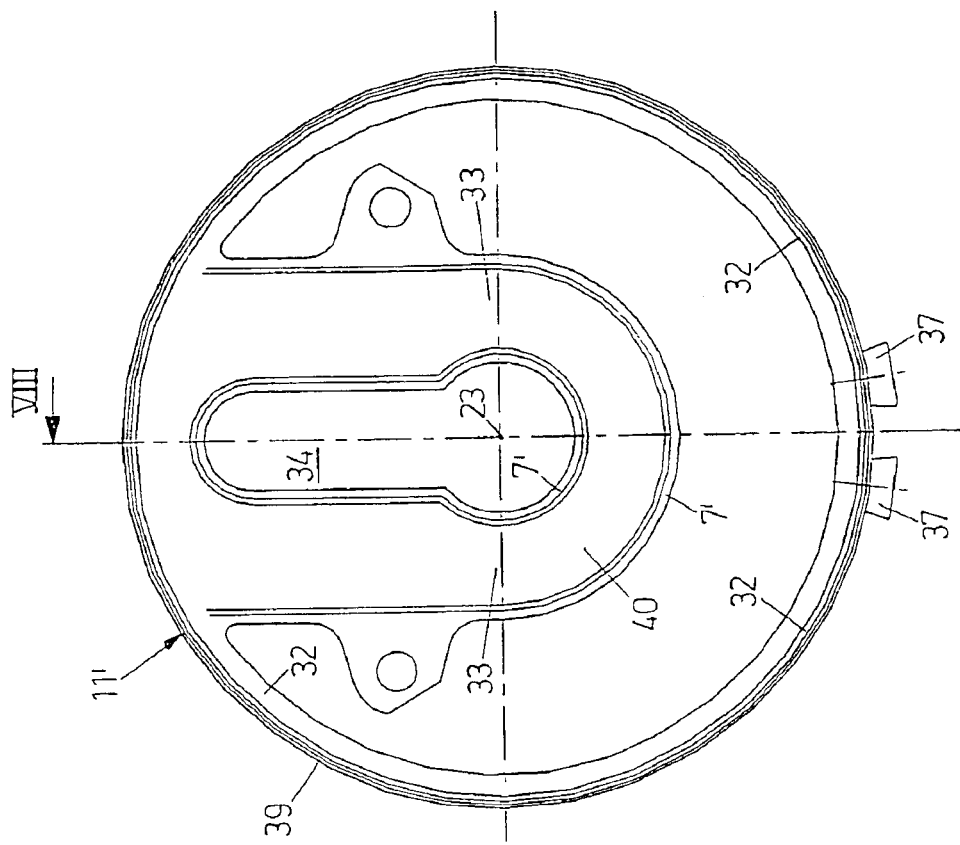
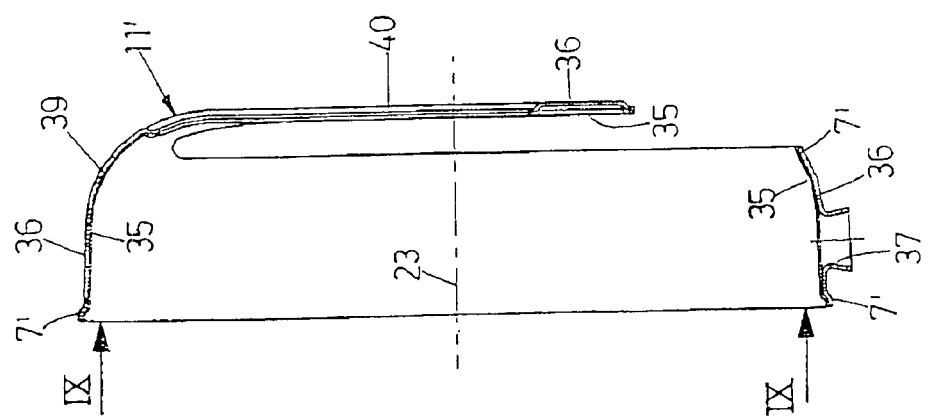

CASTING SHEET COMPOSITE BODY AND METHOD FOR PRODUCING THE SAME

The invention concerns a cast/sheet-metal composite body and a method for producing it.

BACKGROUND OF THE INVENTION

If passages for a cooling fluid are to be integrated in a housing made of metal casting, e.g., for an alternator, two methods for producing them are known. On the one hand, the housing can be produced using the sand-casting method with an appropriate core. This is expensive for series production in particular. On the other hand, the housing can be produced in two parts using the diecasting method—if the geometry allows this—whereby the two housing parts must then be interconnected in sealed fashion. This is expensive as well.

SUMMARY OF THE INVENTION

The invention is based on the object of creating a method for producing cast parts in which passages can be integrated as easily as possible. The essence of the invention lies in the creation of a cast/sheet-metal composite body, in which, after the cast part is produced, the integrated sheet-metal part is deformed in plastic fashion. The advantage of this is that fluid-sealed and pressure-sealed passages can be formed even in highly inaccessible regions of a complex cast part.

The sheet metal part is composed of two superimposed metal sheets. The advantage of this is that the hollow space formed is bordered only by metal sheets and not by the cast part itself. As a result of this, greater resistance to corrosion can be attained.

Additional features and details of the invention result from the description of three exemplary embodiments with reference to the drawings.

BRIEF DESCRIPTION OF THE DRAWINGS

FIG. 1 shows a first method step for producing a composite body according to an initial exemplary embodiment, FIG. 2 shows a second method step for producing a composite body according to the first exemplary embodiment, FIG. 3 shows a third method step for producing a composite body according to the first exemplary embodiment, FIG. 4 shows a fourth method step for producing a composite body according to the first exemplary embodiment, FIG. 5 shows a fifth method step for producing a composite body according to the first exemplary embodiment, FIG. 6 shows a sixth method step for producing a composite body according to the first exemplary embodiment, FIG. 7 shows a cross section of the composite body according to the first exemplary embodiment, FIG. 8 shows a sheet-metal part for producing a composite body according to a second exemplary embodiment, FIG. 9 shows a top view of the sheet-metal part according to the visual-direction arrows IX—IX in FIG. 8.

DETAILED DESCRIPTION OF THE PREFERRED EMBODIMENTS

Figure 11:
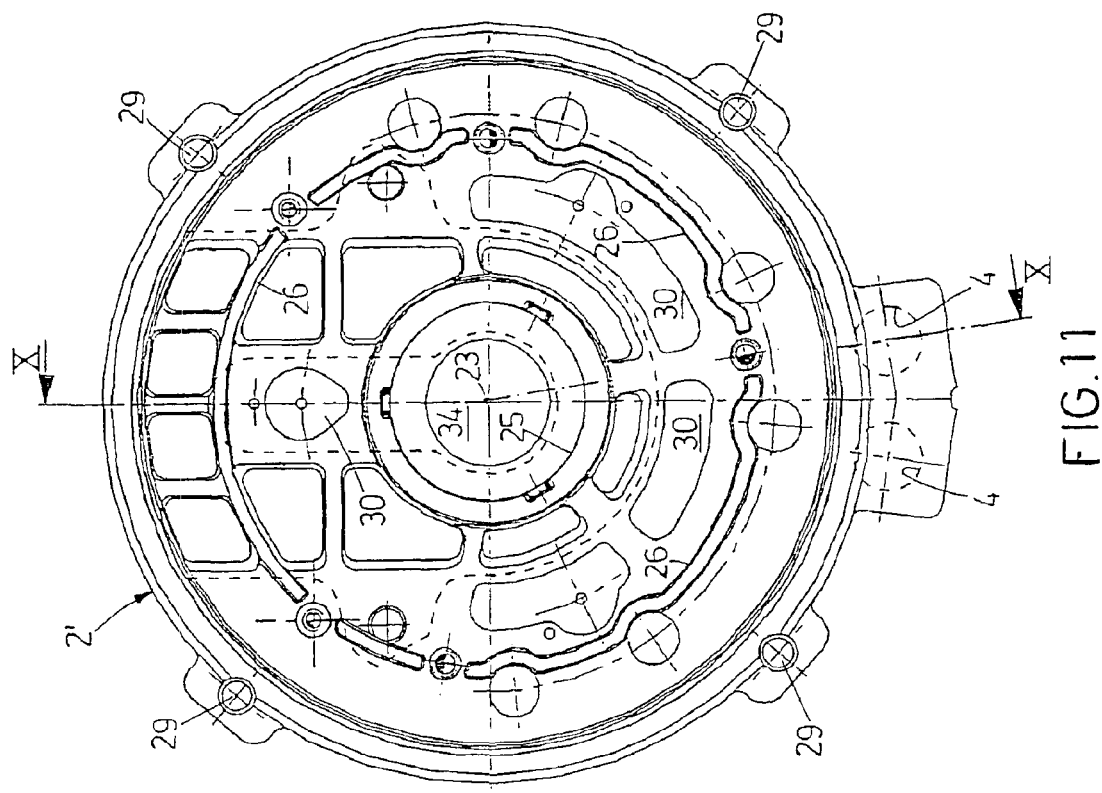
FIG. 11 shows a top view according to the visual-direction arrows XI—XI in FIG. 10.

A method for producing a cast/sheet-metal composite body 1 will be described hereinbelow within the scope of a first exemplary embodiment with reference to FIGS. 1 through 7. The first description refers to the finished composite body 1, with reference to FIG. 7. The composite body 1 comprises a cast part 2. Said cast part includes two annular connecting bars 3 arranged side-by-side and bordering an upwardly open connection bore 4 in each case. The connecting bars 3 are interconnected via a base plate 5. A sheet-metal plate 6 extending substantially parallel to the base plate 5 is located underneath said base plate, which said sheet-metal plate is embedded and fixed in the cast part 2 along its entire edge portion 7 in pressure-sealed fashion. A passage 8 is formed between the base plate 5 and the sheet-metal plate 6, which said passage interconnects the two connection bores 4, inside each of which a connection fitting 9 is fixed by means of press fit. A tube 10 for the supply or carrying away of cooling water is secured to each of the connection fittings 9, which extend past the respective connecting bars 3.

To produce the composite body 1, a sheet-metal blank 11 formed as a sheet-metal part is placed in a diecasting mould 12 composed of a first half 13 and a second half 14, as shown in FIG. 1. The sheet-metal blank 11 comprises an upwardly projecting edge portion 7. The cast part 2 is then created in the mould 12, whereby the edge portion 7 is interconnected with the cast part 2 in sealed fashion. The sheet-metal plate 6 lies on the underside of the base plate 5. The cast part 2 is then machined-down and deburred, as shown in FIG. 3. After this, as shown in FIG. 4, the connection fittings 9 are inserted in the bores 4, in which they are fixed by means of press fit. The cast part 2 is then placed in a pressure application mould 15 that is composed of a first half 16 and a second half 17. The mould 15 comprises an interior space 18 that basically matches the exterior contour of the part shown in FIG. 4. A recess 19 designed in the shape of a passage is provided in the half 17, adjacent to the exposed sheet-metal plate 6. Sealing rings 20 are arranged on the bars 3 to pressure-seal the interior space 18 from the environment. The half 16 comprises two upwardly open connection passages 21, by means of which the sheet-metal plate 6 is acted upon with pressure via compressed air or a pressurized fluid. As a result of the pressure application, the sheet-metal plate 6 is pressed into the recess 19 and deformed in plastic fashion until it takes on the shape shown in FIGS. 6 and 7. As a result of the plastic compression strain, the passage 8 is produced between the base plate 5 and the sheet-metal plate 6, which said passage interconnects—in sealed fashion—the connection fitting 9 situated on the left with the connection fitting 9 situated on the right. In the step shown in FIG. 6, the composite body 1 is subjected to an airtightness test using compressed air, whereby potential leaks are detected over time by means of a drop in pressure.

The method described above has numerous advantages. By using comparably simple diecasting moulds 12, it is possible to produce cast/sheet-metal composite bodies 1 having inboard passages 8. The fact that installation space can be spared overall is of central significance here. The moulds 12 do not require cores, which would have to be removed in expensive fashion. Production costs can be greatly reduced as a result. In particular, single-component housings can be combined with heat exchangers, and they can be interconnected even in the case of geometrically complex shapes. When heat exchangers are involved, a cooling fluid is conducted through the passages 8, so that the heat given off at the composite body 1 can be dissipated particularly efficiently, since the thermal conduction paths to the cooling system are shortened. Moreover, by using sheet-metal parts, the thickness of the passage walls can be reduced—at least on one side—in comparison with a wall consisting of cast material. Further installation space is spared as a result.

A second exemplary embodiment of the invention is described hereinbelow with reference to FIGS. 8 through 13. Identical parts are assigned the same reference numerals as in the first exemplary embodiment, the description of which is herewith referred to. Parts that are functionally identical but different in terms of design are assigned the same reference numerals plus one superscript mark. As in the first exemplary embodiment, the finished composite body 1' is described initially with reference to FIG. 13. The method for producing the composite body 1' is then explained with reference to FIGS. 8 through 12. The composite body 1' is a collector-ring end shield for an electrical alternator. It comprises an annular-cylindrical housing wall 22 having a center longitudinal axis 23 and a base 24 extending at a right angle to the center longitudinal axis 23. A roller-bearing seat 25 for housing a rotor shaft is arranged in the center of the base. An axially projecting annular frame 26—which is concentric with said roller-bearing seat and has a larger diameter—is interconnected with the base 24, which said annular frame radially borders a fan wheel space 27 in the direction toward the center longitudinal axis 23. An annular winding head space 28 for a winding head of the stator of the alternator is located between the annular frame 26 and the housing wall 22. Distributed around the circumference, bores for clamping bolts are provided on the outside of the housing wall 22 extending parallel to the center longitudinal axis 23 to interconnect the two end shields of the alternator. A plurality of fan recesses 30 is provided in the base 24, between the external circumference of the roller-bearing seat 25 and the annular frame 26, which said fan recesses connect the fan wheel space 27 with the environment. A heat exchanger 31 is provided in the housing wall 22 and in the base 24. Said heat exchanger is composed of an annular passage section 32 that is arranged circumferentially on the inside of the wall 22, as well as a U-shaped passage section 33 interconnected with the passage section 32, which said U-shaped passage section encloses the roller-bearing seat 25 while forming a keyhole opening 34. The passage sections 32 and 33 are bordered by an internal metal sheet 35 and an external metal sheet 36 that are superimposed along their edges and are friction-welded to each other along one edge portion 7'. The metal sheets 35 and 36 are positioned, in pressure-sealed fashion, in the unit—comprising wall 22 and base 24—developed as cast part 2' along the edge portion 7', and they are fixed there. In the region of the lower end of the passage section 32, the exterior metal sheet 36 has two radially outwardly extending connection openings 37 that are connected via a connection passage 38 arranged on the wall 22 with a connection fitting 9 extending parallel to the center longitudinal axis 23, which said connection fitting is fixed in a connection bore 4 with press fit. One of the two connection fittings 9 serves to supply cooling water, and the other serves to carry cooling water away.

Figure 10:
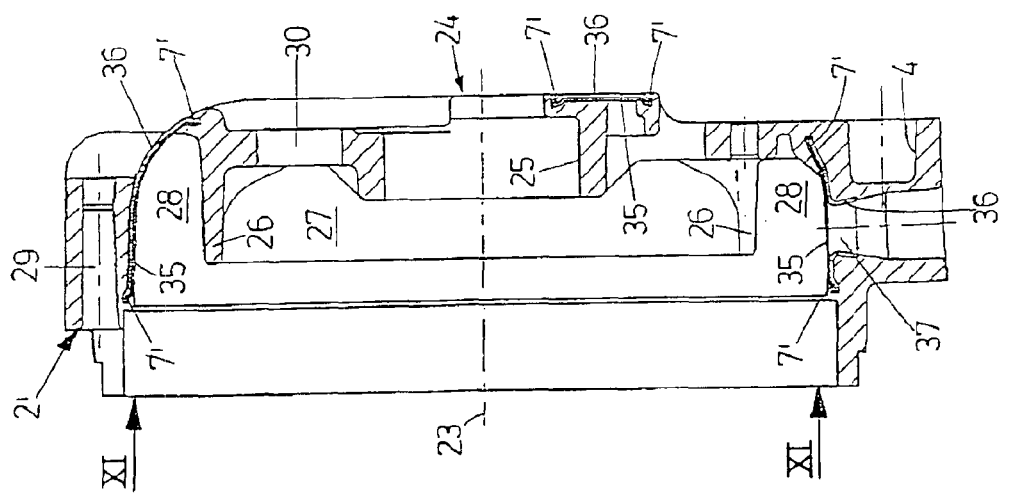
FIG. 10 shows a further method step for producing the composite body according to a second exemplary embodiment.
Figure 12:
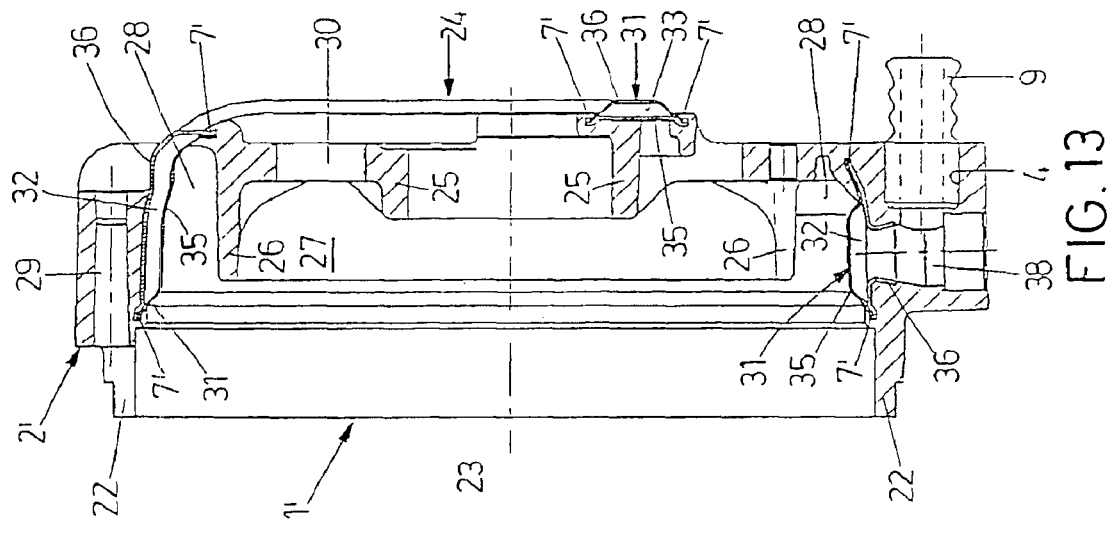
FIG. 12 shows a further method step for producing the composite body according to the second exemplary embodiment.
Figure 13:
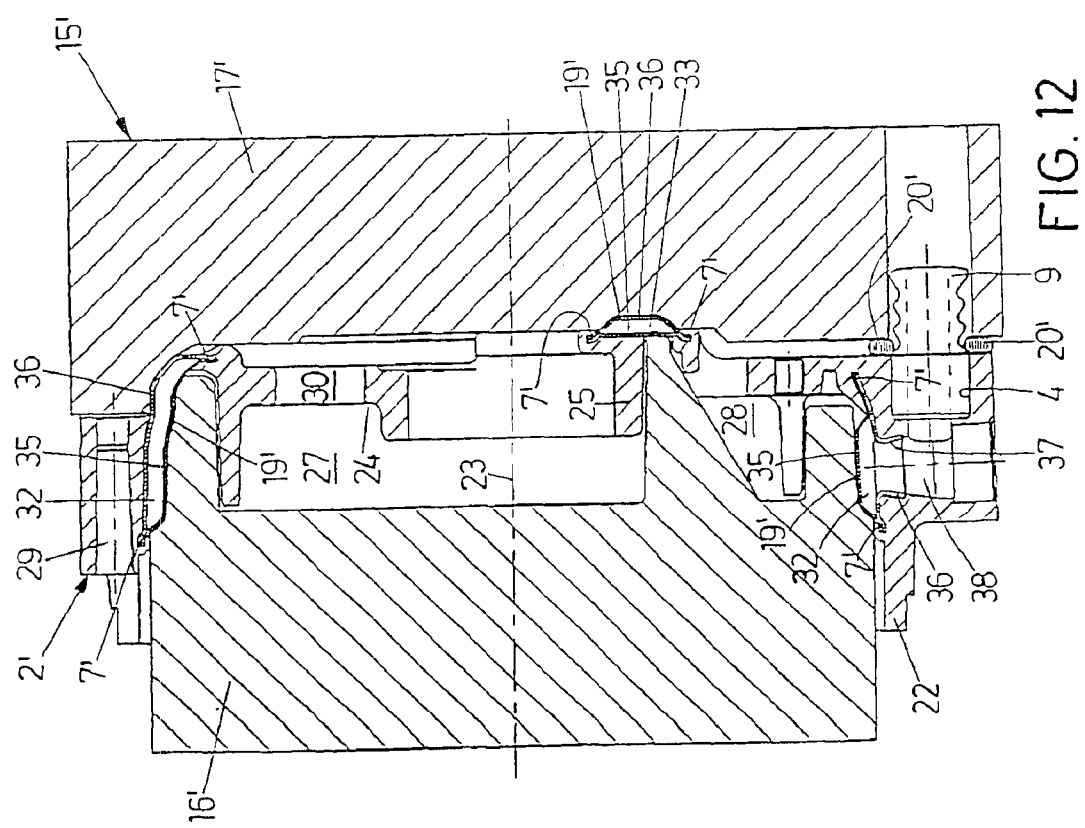
FIG. 13 shows a cross-sectional illustration of the composite body according to the second exemplary embodiment.

The chronological sequence of the production method of the composite body 1' is described hereinbelow with reference to FIGS. 8 through 12. A sheet-metal blank 11' developed as sheet-metal part and having the structure shown in FIGS. 8 and 9 is first produced. The sheet-metal blank 11' has a ring portion 39 and a base portion 40, whereby the base portion 40 basically comprises a U-shaped cross section, and the two arms of the U are developed integral with the ring portion 39 at their upper ends. The sheet-metal blank 11' is composed of two superimposed metal sheets, i.e., the interior metal sheet 35 and the exterior metal sheet 36, which are friction-welded to each other along the edge portions 7'. The sheet-metal blank 11' is placed in a diecasting mould and covered with a cast part 2' applied by injection moulding. The result is shown in FIGS. 10 and 11. In the next step, deburring and machining-down takes place, and the connection fittings 9 are inserted. Following this, the cast part 2' is placed in a pressure-application mould 15' in which recesses 19' are provided adjacent to the exposed metal sheets 35 and 36. The space between the metal sheets 35 and 36 is then acted upon with compressed air, so that the interconnected passage sections 32 and 33 are produced. The finished composite body 1', shown in FIG. 13, is then subjected to an air-tightness test.

Due to the combination of diecast and sheet-metal parts, a heat exchanger 31—in the case of the composite body 1—can be positioned in the end shield of an alternator, so that the waste heat produced can be dissipated without a problem, even in the case of increased-output alternators. The total device is extremely space-saving. The coolant passage 8' composed of the passage sections 32 and 33 is bordered only by the metal sheets 35 and 36, but not by the cast material. Aluminum is often used as the material for the metal sheets 35 and 36. Due to its degree of purity, aluminum is much more resistant to corrosion in the presence of fluids than the alloy used for the metal cast.

Figure 14:
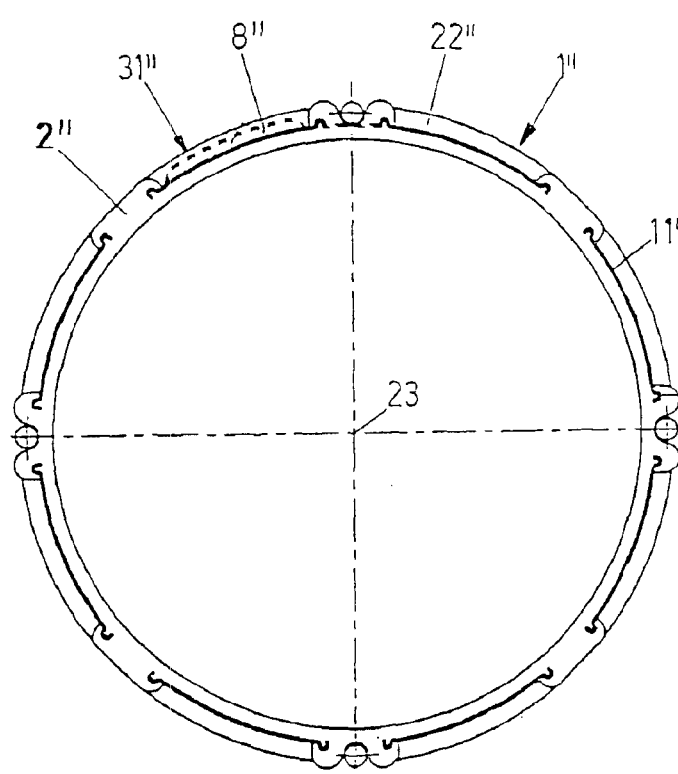
FIG. 14 shows a cross-sectional illustration of the composite body according to a third exemplary embodiment.
Figure 15:
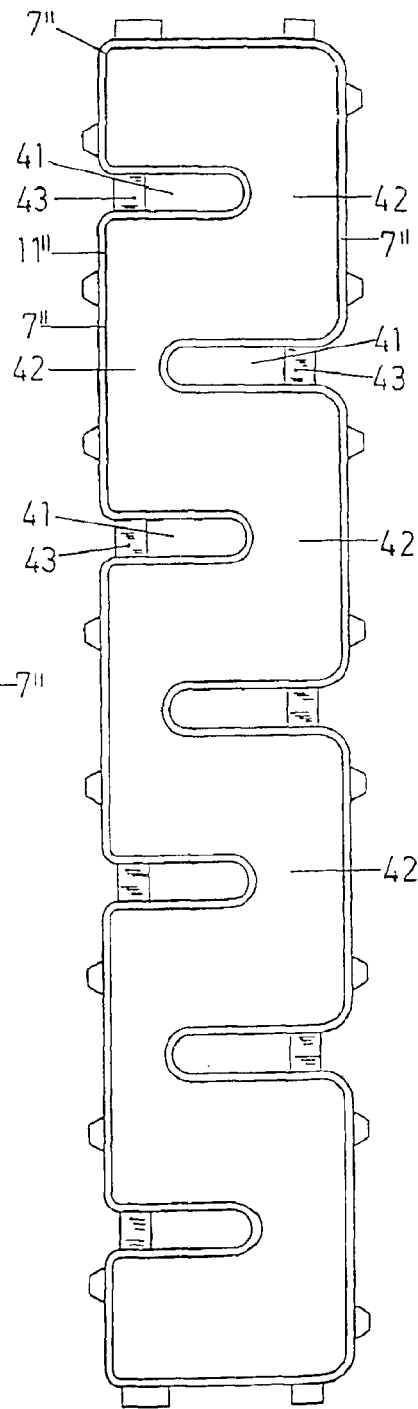
FIG. 15 shows a top view of the sheet-metal part of the composite body according to the third exemplary embodiment.

A third exemplary embodiment of the invention is described hereinbelow with reference to FIGS. 14 and 15. Identical parts are assigned the same reference numerals as in the first exemplary embodiment. Parts that are functionally identical but different in terms of design are assigned the same reference numerals plus two superscript marks. The composite body 1" represents an annular-cylindrical housing wall 22" in which a heat exchanger 31" is integrated. The composite body 1" has an annular-cylindrical housing wall 22" in which a sheet-metal blank 1" is integrated that is interconnected with the cast part 2" along the edge portions 7". A passage 8" is produced between the cast part 2" and the sheet-metal blank 11" by means of the pressure application. Said passage is indicated in FIG. 14 by a dashed line. The sheet-metal blank 11" is developed as a strip meandering in shape that comprises recesses 41 open to the left and to the right in alternating fashion. Meander strips 42 are interconnected over metal bands 43 in the region of the recesses 41. The meander strips 42 have an edge portion 7"' designed in the shape of a bar. Space is created, by means of the recesses 41, for the axially extending clamping bolts housed in the bores 29.

What is claimed is:

1. A method for producing a cast/sheet-metal composite body (1; 1'; 1"), comprising the following steps:
   providing a casting mold (12),
   placing at least one sheet-metal part (11; 11'; 11") in the casting mold (12), the at least one sheet-metal part (11; 11") having a sheet-metal plate (6), producing a cast part (2; 2'; 2") having a base plate (5) and interconnected with the at least one sheet-metal part (11; 11'; 11"), and applying pressure to the at least one sheet-metal part (11; 11'; 11") to form a hollow space (8; 8"), the hollow space (8; 8") being produced between the base plate (5) of the cast part (2; 2") and the sheet-metal plate (6) of the sheet-metal part (11; 11").

2. The method according to claim 1, wherein a deburring and/or a machining-down of the cast part (2; 2'; 2") takes place before pressure is applied.

3. The method according to claim 1, wherein the cast part (2; 2'; 2")—before pressure is applied—is placed in a pressure-application form (15; 15') to shape the sheet-metal part (11; 11'; 11").

4. The method according to claim 1, wherein the pressure application takes place by means of the pressure action of a gas or a fluid on the sheet-metal part (11; 11'; 11").

5. The method according to claim 1, wherein the sheet-metal part (11") is designed meandering in shape.

6. A method for producing a cast/sheet-metal composite body (1'), comprising the following steps:

providing a cast mold (12);

placing at least one sheet-metal part (11') in the casting mold (12), wherein the sheet-metal part (11') is composed of a first metal sheet (35) and a second metal sheet (36) superimposed on the first metal sheet (35) flat at least in parts;

producing a cast part (2") interconnected with the at least one sheet-metal part (11'); and applying pressure to the at least one sheet-metal part (11') to form a hollow space (8'), wherein the first metal sheet (35) is at least partially lifted away from the second metal sheet (36) by means of the pressure application, forming a hollow space (8').

7. The method according to claim 6, wherein a deburring and/or a machining-down of the cast part (2; 2'; 2") takes place before pressure is applied.

8. The method according to claim 6, wherein the cast part (2; 2', 2")—before pressure is applied—is placed in a pressure-application form (15; 15') to shape the sheet-metal part (11; 11'; 11").

9. The method according to claim 6, wherein the pressure application takes place by means of the pressure action of a gas or a fluid on the sheet-metal part (11; 11'; 11").

* * * * *